(12) United States Patent
Ikedo

(10) Patent No.: US 7,440,080 B2
(45) Date of Patent: Oct. 21, 2008

(54) METHOD AND APPARATUS FOR AUTOMATIC CORRECTION OF DIRECT EXPOSURE APPARATUS

(75) Inventor: Kenji Ikedo, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 440 days.

(21) Appl. No.: 11/303,900

(22) Filed: Dec. 15, 2005

(65) Prior Publication Data

US 2006/0132745 A1    Jun. 22, 2006

(30) Foreign Application Priority Data

Dec. 17, 2004    (JP)    ............... 2004-366268

(51) Int. Cl.
G03B 27/52    (2006.01)
G03B 27/68    (2006.01)
(52) U.S. Cl. .......................... 355/55; 355/52
(58) Field of Classification Search .................. 355/52, 355/53, 55, 77; 250/548; 356/399–401
See application file for complete search history.

(56) References Cited

U.S. PATENT DOCUMENTS 6,529,265 B1    3/2003    Henningsen 7,280,129 B2 *    10/2007    Takada ................. 347/235

FOREIGN PATENT DOCUMENTS

| JP | 10-112579 | 4/1998 |
|---|---|---|
| JP | 2001-519925 | 10/2001 |
| JP | 2001-521672 | 11/2001 |
| JP | 2004-226520 | 8/2004 |
| WO | 98/47042 | 10/1998 |

* cited by examiner

Primary Examiner—Hung Henry Nguyen
(74) Attorney, Agent, or Firm—Morgan & Finnegan, LLP

(57) ABSTRACT

An automatic correction method for a direct exposure apparatus illuminates two exposure elements, which are included in adjacent exposure heads separately and which are to expose an identical line on an exposure target, among exposure elements arranged in a two-dimensional manner with an inclination of relative movement of an exposure target in a plurality of exposure heads arranged in the direction of the relative movement of the exposure target; detects the illumination of the two exposure elements by using a sensor board (11) that is moved, on the side where the exposure heads are illuminated, in the direction in which the exposure heads are arranged; and calculates correction amounts for correcting so that the two exposure elements can expose the identical line mentioned above, based on a detection result of the illumination of the exposure elements by the sensor board (11).

13 Claims, 16 Drawing Sheets

Fig.1
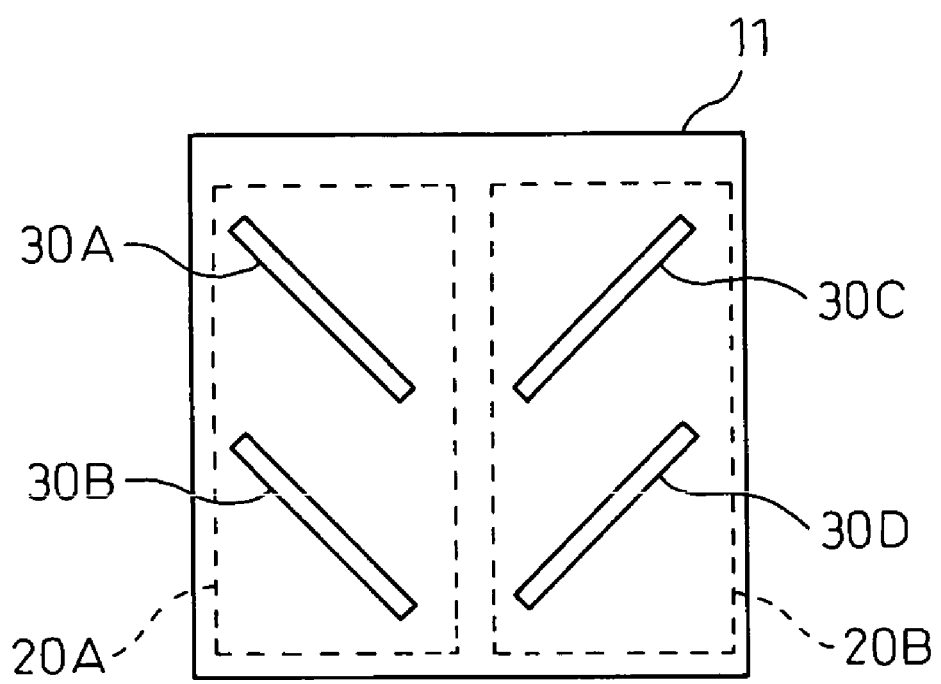
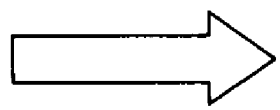
DIRECTION IN WHICH EXPOSURE HEADS ARE ARRANGED

DIRECTION OF MOVEMENT
OF SENSOR BOARD

DIRECTION IN WHICH EXPOSURE HEADS ARE ARRANGED

DIRECTION IN WHICH EXPOSURE HEADS ARE ARRANGED

DIRECTION IN WHICH EXPOSURE
HEADS ARE ARRANGED

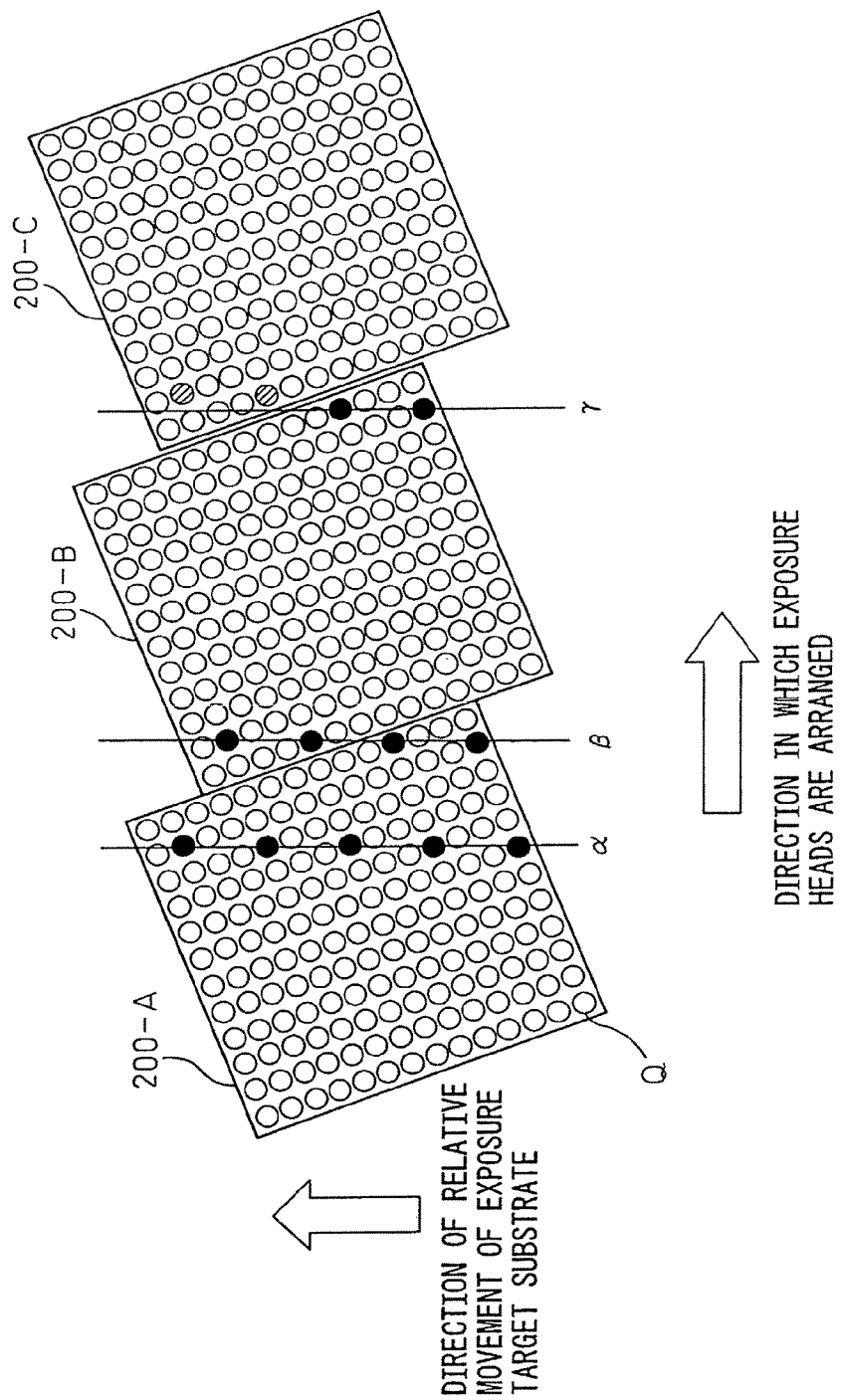

METHOD AND APPARATUS FOR AUTOMATIC CORRECTION OF DIRECT EXPOSURE APPARATUS

BACKGROUND OF THE INVENTION

1. Field of the Invention

The present invention relates to a method and apparatus for automatic correction of a direct exposure apparatus comprising a plurality of exposure heads that have exposure elements arranged in a two-dimensional manner at an inclination with respect to relative movement of an exposure target and that are arranged in a direction orthogonal to the relative movement.

2. Description of the Related Art

In recent years, patterning methods, by direct exposure, that do not use photomasks have been proposed. According to these methods, correction for dealing with expansion and contraction, distortion, deviation and the like of substrates can be performed easily at the stage of generation of exposure data in advance or in real time and, therefore, in comparison with patterning methods using photomasks that have been commonly used in the past, remarkable improvement such as increased manufacturing accuracy and yield, shorter delivery time, reduced manufacturing costs and the like can be achieved.

The patterning methods by direct exposure include, for example, methods for forming exposure patterns by direct exposure process using a Digital Micromirror Device (DMD) or an electron beam exposure machine.

Japanese Unexamined Patent Publication No. 10-112579 describes an example of the conventional patterning methods by direct exposure using DMD. In this technique, when a resist formed on an exposure target (e.g., an exposure target substrate) is exposed directly, pattern data is generated according to a pattern to be exposed, then, this pattern data is input to Digital Micromirror Device (DMD) and, then, a plurality of micro mirrors of the DMD are tilted according to the pattern data so that directions of reflected light from each micro mirror obtained by projecting light on the DMD are changed appropriately and the reflected light illuminates the resist on the exposure target substrate. As a result of this illumination, an exposure pattern corresponding to the pattern data is formed. In general, the micro mirrors in the DMD are arranged in a two-dimensional manner so that directions in which rows and columns are arranged intersect each other at right angles. Therefore, the distance between the micro mirrors would usually correspond to resolution of the wiring pattern that can be formed by the direct exposure apparatus.

Further, National Publication of Translated Version No. 2001-521672 (corresponding to WO98/47042) discloses a technique in which micro mirrors arranged in a two-dimensional manner are tilted with respect to a direction of relative movement of an exposure target substrate so that direct exposure process can be performed with resolution smaller than the space between the micro mirrors of a DMD. Still further, Japanese Unexamined Patent Publication No. 2004-226520 discloses a technique for adjusting the tilt angles of the micro mirrors of a DMD.

FIG. 16 is a diagram schematically showing a direct exposure system. A direct exposure system 100 comprises a direct exposure apparatus 101, and a computing machine 102 connected to the direct exposure apparatus 101. The computing machine 102 supplies exposure data to the direct exposure apparatus 101 and controls the direct exposure apparatus 101. The direct exposure apparatus 101 comprises a stage 110 on which an exposure target substrate 151 is mounted, and exposure means 111 that moves above the exposure target substrate 151 with respect thereto in the direction of the arrow in the figure. The exposure means 111 comprises a plurality of exposure heads (not shown) to which an area to be exposed on a surface of the exposure target substrate 151 is assigned and each of which performs exposure process in parallel. When the direct exposure apparatus comprises a DMD, exposure elements in the exposure heads are the micro mirrors of the DMD.

FIG. 17 is a diagram exemplifying exposure heads in a conventional direct exposure apparatus. In the figure, micro mirrors of a DMD constituting exposure heads 200-A, 200-B and 200-C are designated by circles (a reference symbol Q). Here, it is to be noted that the number and size of the exposure heads 200-A, 200-B and 200-C and the micro mirrors Q arranged thereon in a two-dimensional manner is shown merely by way of example. Typically, one exposure head cannot expose an entire area of the exposure target substrate and, therefore, a plurality of exposure heads 200-A, 200-B and 200-C are arranged in a direction orthogonal to relative movement of the exposure target substrate and used for exposure process.

An area on a line along the relative movement of the exposure target substrate is illuminated by a plurality of exposure elements. More specifically, as shown in FIG. 17, for example, five exposure elements (indicated by black-filled circles in the figure) get involved in the exposure process on a line α and four exposure elements (also indicated by black-filled circles in the figure) get involved in the exposure process on a line β.

As described above, in the direct exposure apparatus, whether the intended exposure process is completed or not is determined by whether the light energy accumulated through k exposures exceeds the threshold for exposing the photoresist applied on the exposure target substrate. Therefore, if a sufficient number of exposure elements are provided, for example, some exposure elements may not illuminate normally due to failure of micro mirrors in DMD in a DMD-based patterning method, driving transistors of LCD elements and the like, but the eventual exposure result is not likely to be seriously affected. In other words, reliability of the direct exposure apparatus is based on redundancy of the number of exposure elements described above.

However, attachment positions of adjacent exposure heads may deviate due to some reasons such as mechanical errors and the like. For example, as shown in FIG. 17, when the attachment position of the exposure head 100-B constituted by the DMD deviates from that of the adjacent exposure head 100-C, only two exposure elements (indicated by black-filled circles in the figure) get involved in the exposure process on a line γ, while two exposure elements that are indicated by diagonally shaded circles in the figure and that should get involved in the exposure process essentially fall outside the line γ. When there are deviations of the attachment positions of the exposure heads as described above, the decreased number of exposure elements getting involved in the exposure process cannot ensure sufficient light energy required for exposure and, as a result, wiring patterns of finished products may be affected seriously.

In order to correct the deviations of the attachment positions of the exposure heads as described above, in the past, an image of wiring patterns obtained by actual direct exposure in the concerned direct exposure apparatus is observed by using a microscope to measure actual deviations. Such procedure is time and labor consuming and it takes unwanted costs to expose a substrate and form wirings actually.

Thus, in view of the above problem, it is an object of the present invention to provide a method and apparatus for automatic correction that obtains correction amounts for correcting deviations of attachment positions of exposure heads in a direct exposure apparatus comprising a plurality of exposure heads that have exposure elements arranged in a two-dimensional manner with an inclination with respect to relative movement of an exposure target and that are arranged in a direction orthogonal to the relative movement.

SUMMARY OF THE INVENTION

In order to achieve the above objects, in the present invention, there is provided an automatic correction method for a direct exposure apparatus, comprising:

an illumination step of illuminating two exposure elements, which are included in adjacent ones of exposure heads separately and which are to expose an identical line on an exposure target, among exposure elements arranged in a two-dimensional manner in a plurality of the exposure heads in a direction of relative movement of the exposure target with an inclination with respect to the direction of the relative movement; a detection step of detecting the illumination of the two exposure elements by using a sensor board that is moved, on the side where the exposure heads are illuminated, in the direction in which the exposure heads are arranged; and a correction step of calculating correction amounts for correcting so that the two exposure elements can expose the identical line on the exposure target, based on a detection result of the illumination of the exposure elements by the sensor board.

FIG. 1 is a schematic front elevational view of a sensor board in an automatic correction apparatus according to the present invention.

A sensor board 11 in an automatic correction apparatus according to the present invention has two sensor sets (designated by reference numerals 20A and 20B) in each of which two linear light detecting sensors 30A, 30B and 30C, 30D, respectively, that are parallel with each other are arranged at specific angles with respect to the direction in which the exposure heads are arranged (indicated by the arrow in the figure). The light detecting sensors 30A and 30B in the sensor set 20A and the light detecting sensors 30C and 30D in the sensor set 20B are arranged on the sensor board 11 so that the former has a specific angle mentioned above that is different from that of the latter.

Further, the automatic correction apparatus according to the present invention comprises moving means (not shown) for moving the sensor board 11, on the side where the exposure heads are illuminated, in a direction in which the exposure heads are arranged so that two exposure elements, which are included in adjacent ones of the exposure heads separately and which are to expose an identical line on an exposure target, e.g., an exposure target substrate, among exposure elements arranged in a two-dimensional manner in a plurality of exposure heads in a direction of relative movement of the exposure target substrate. The automatic correction apparatus according to the present invention further comprises correction means (not shown) for calculating correction amounts for correcting so that the two exposure elements can expose the identical line on the exposure target substrate, based on a detection result of the illumination of the two exposure elements by the sensor board 11.

BRIEF DESCRIPTION OF THE DRAWINGS

The present invention will be more clearly understood from the description as set below with reference to the accompanying drawings, wherein:

FIG. 1 is a schematic front elevational view of a sensor board in an automatic correction apparatus according to the present invention;

FIG. 17 is a diagram exemplifying exposure heads in a conventional direct exposure apparatus.

DESCRIPTION OF THE PREFERRED EMBODIMENTS

Figure 2:
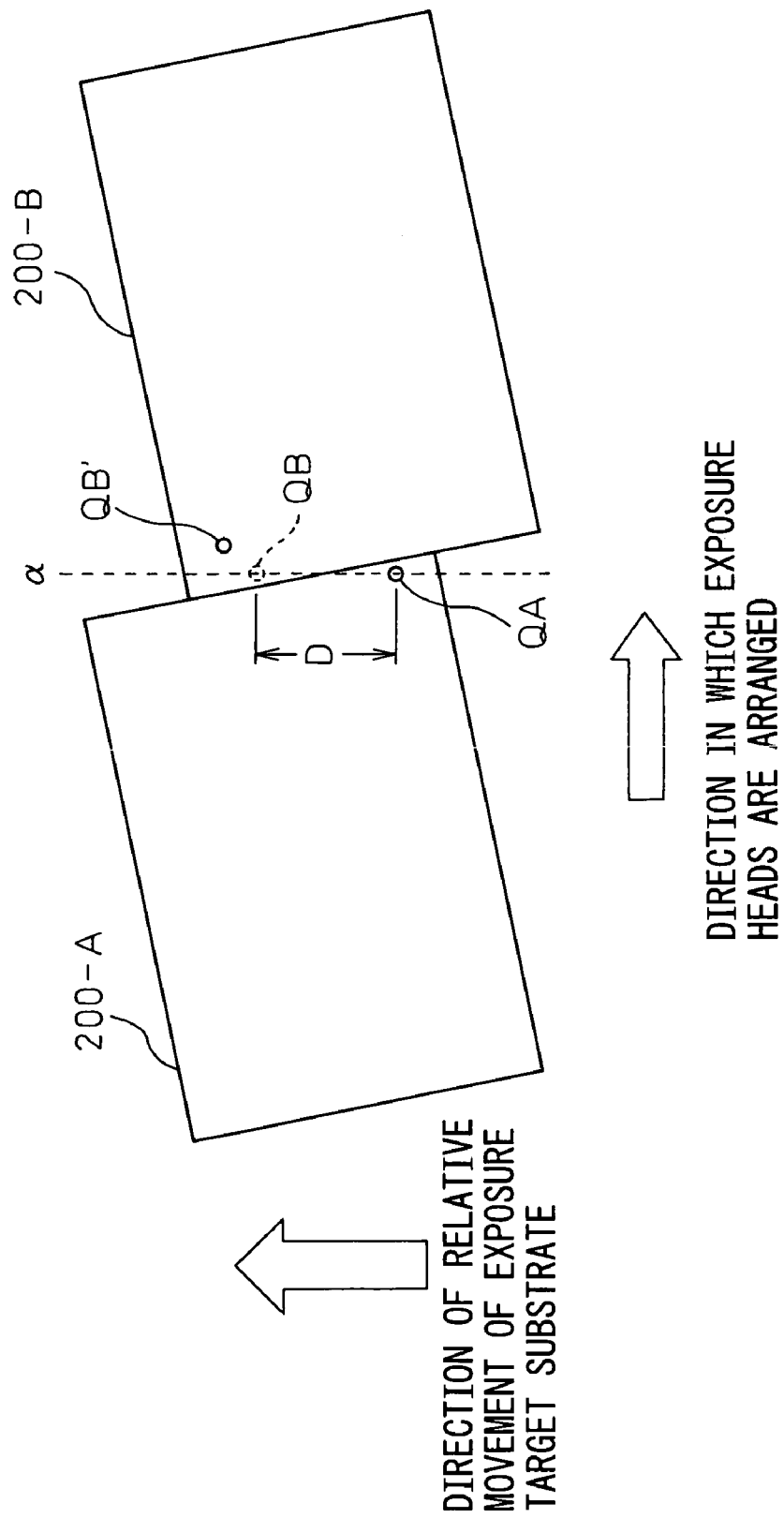
FIG. 2 is a diagram for describing illumination of exposure elements in exposure heads in an embodiment of the present invention.

FIG. 2 is a diagram for describing illumination of exposure elements in exposure heads in an embodiment of the present invention. When the exposure heads in a direct exposure apparatus are comprised of a DMD, the exposure elements in the exposure heads are micro mirrors of the DMD.

While there are a plurality of exposure elements in a plurality of exposure heads arranged in a direction of relative movement of an exposure target substrate, in this embodiment, among the plurality of exposure elements, only two exposure elements QA and QB', which are included in adjacent exposure heads 200-A and 200-B, respectively, and which are to expose an identical exposure line α on the exposure target substrate, are illuminated. Here, it is assumed that the exposure element QB' deviates from its originally designed position for any reason, though the exposure element QB' is designed to be positioned at QB (shown by a dotted circle) that is apart from the exposure element QA on the exposure line α by a distance D so that it can illuminate the identical exposure line α along with the exposure element QA.

In FIG. 2 and subsequent figures, it is to be noted that only two exposure heads designated by reference numerals 200-A and 200-B are shown and, on the other hand, only the exposure elements to illuminate (that is to say, only the exposure elements shown by reference numerals QA and QB') are shown by solid lines.

In this embodiment, as described above with reference to FIG. 2, the two exposure elements QA and QB' are illuminated and a sensor board 11, which is described above with reference to FIG. 1, is moved in a direction in which the exposure heads are arranged so that light receiving surfaces of each light detecting sensor face toward an illuminating side of the exposure heads. In this embodiment, moving means for this purpose (not shown) is provided.

FIGS. 3 to 7 are diagrams for describing movement of the sensor board with respect to the exposure heads in an embodiment of the present invention.

In this embodiment, the sensor board 11 is moved in a direction in which the exposure heads are arranged at a moving speed s so that the light receiving surfaces of each light detecting sensor face toward the illuminating side of the exposure heads.

Figure 3:
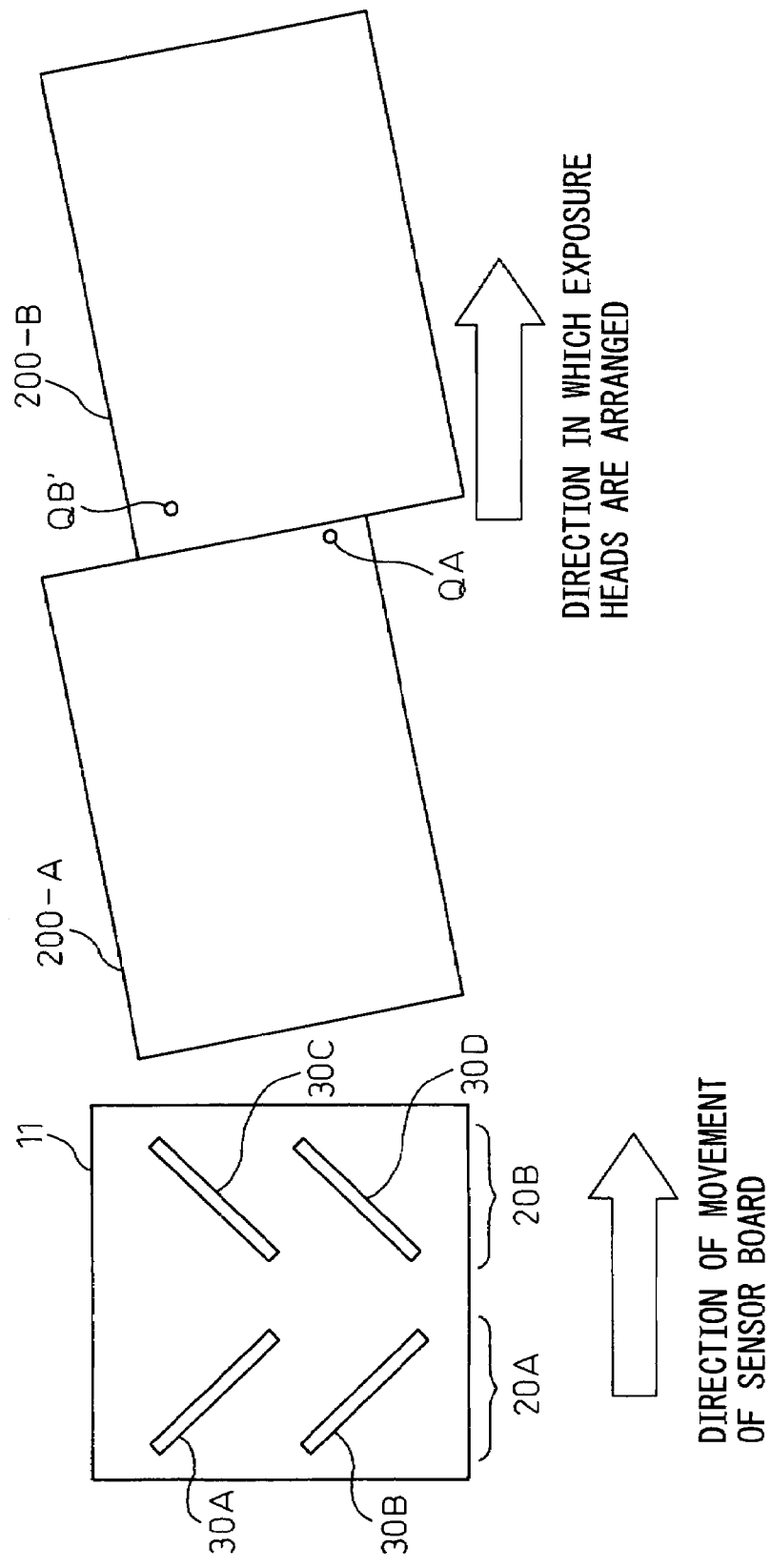
FIG. 3 is a diagram for describing movement of a sensor board with respect to exposure heads in an embodiment of the present invention (Part 1)

As shown in FIG. 3, while only the two exposure elements QA and QB', which are included in the adjacent exposure heads 200-A and 200-B, respectively, and which are to expose the identical exposure line α on the substrate to be exposed, are illuminated, the sensor board 11 is moved in the direction in which the exposure heads are arranged. Then, when the sensor board 11 reaches the position shown in FIG. 4, a light detecting sensor 30D of in a sensor set 20B detects the illumination of the exposure element QA. When the exposure element QB' is positioned at QB (shown by a dotted circle in the figure) on the exposure line identical to the exposure element QA as designed, the light detecting sensor 30D in the sensor set 20B detects illumination of the exposure element QA and, at the same time, a light detecting sensor 30C in the sensor set 20B detects illumination of the exposure element at the position QB. However, in this example, in which it is assumed that the concerned exposure element deviates to the shown position QB' as described above, the light detecting sensor 30C does not detect the illumination.

Figure 5:
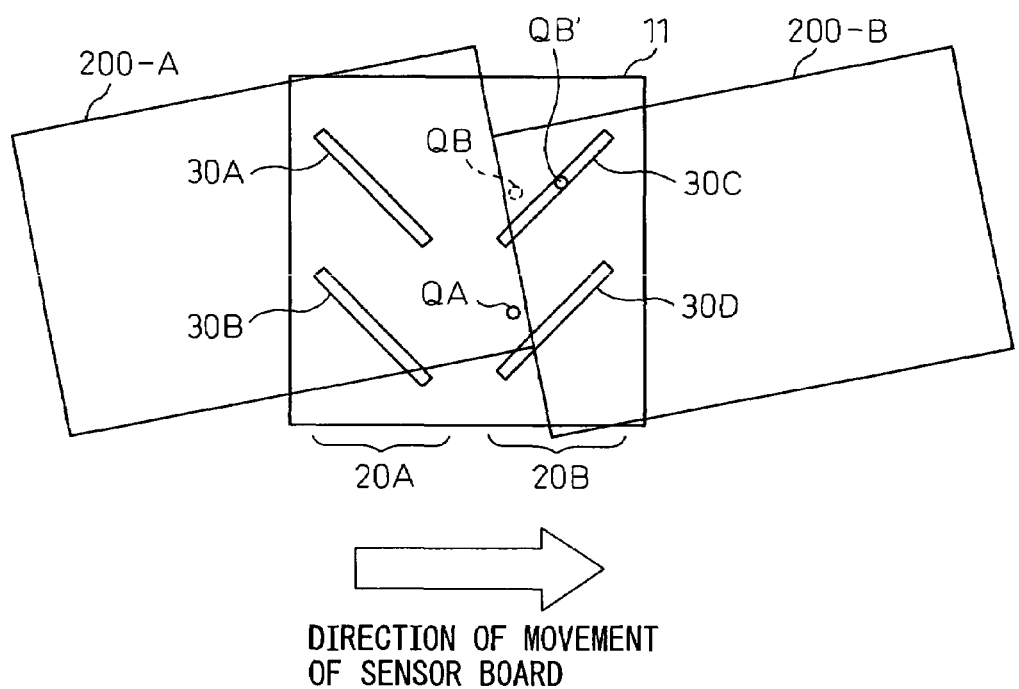
FIG. 5 is a diagram for describing movement of a sensor board with respect to exposure heads in an embodiment of the present invention (Part 3)

As the sensor board 11 is moved further, as shown in FIG. 5, the light detecting sensor 30C in the sensor set 20B detects the illumination of the exposure element QB'. Thus, due to the positional deviation of the exposure element QB', a difference of the time to detect the illumination of the exposure elements occurs between the light detecting sensors 30C and 30D, which are both included in the same sensor set 20B. This time difference is defined as t1 (hereinafter referred to as the "detection time difference").

Figure 6:
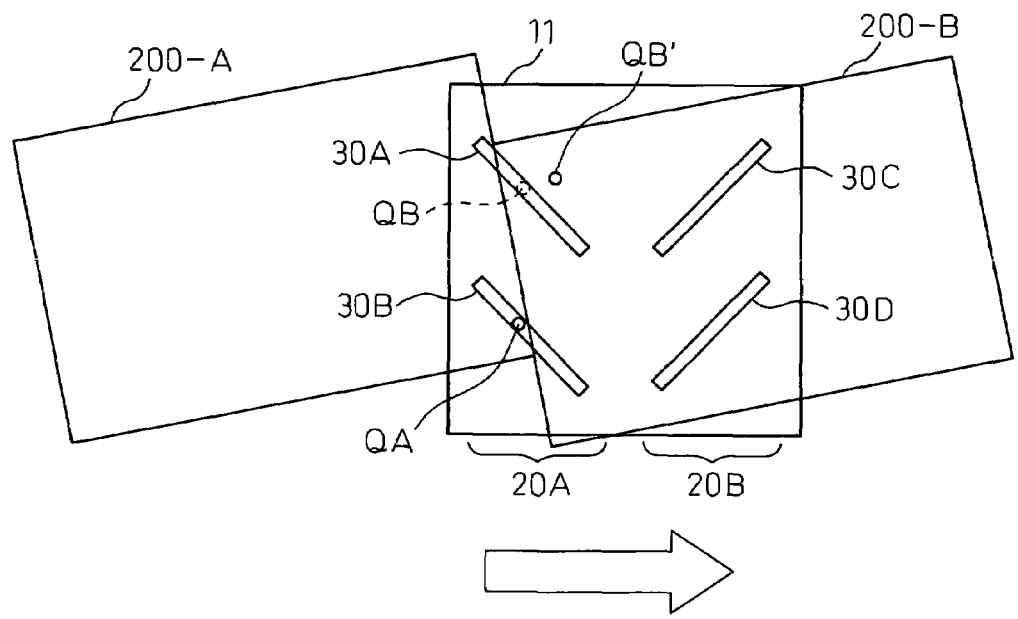
FIG. 6 is a diagram for describing movement of a sensor board with respect to exposure heads in an embodiment of the present invention (Part 4)
Figure 7:
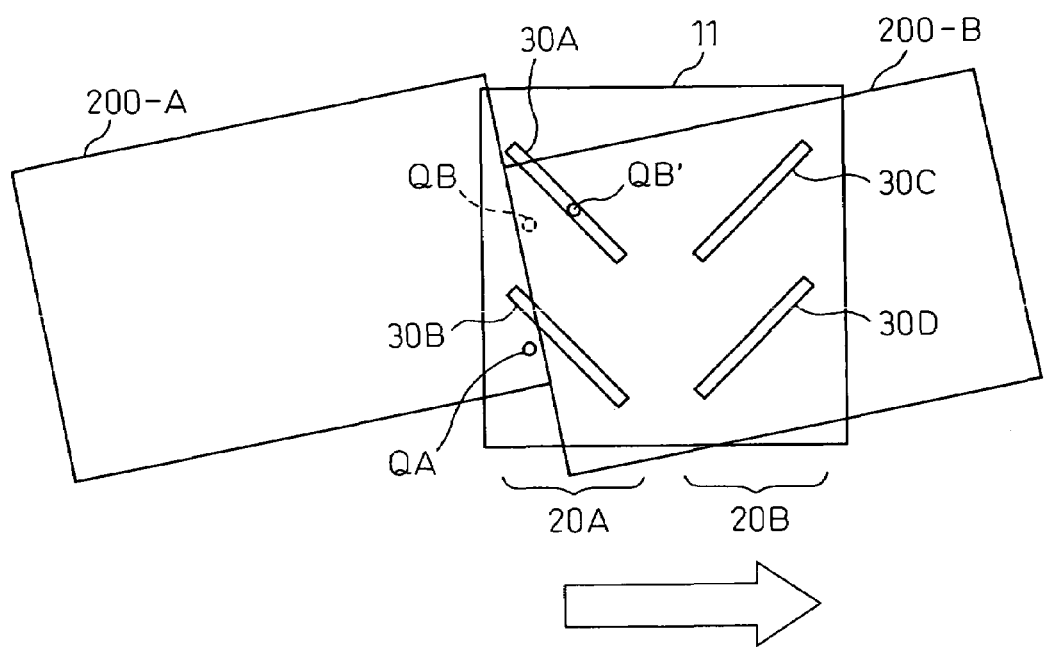
FIG. 7 is a diagram for describing movement of a sensor board with respect to exposure heads in an embodiment of the present invention (Part 5)

As the sensor board 11 is moved further, as shown in FIG. 6, a light detecting sensor 30B in a sensor set 20A detects the illumination of the exposure element QA. Then, as the sensor board 11 is moved further, as shown in FIG. 7, a light detecting sensor 30A in the sensor set 20A detects the illumination of the exposure element QB'. In a similar manner to the case of the sensor set 20B described above, when the exposure element QB' is positioned at the designed position QB on the exposure line identical to the exposure element QA, it would be ideal if the light detecting sensor 30B in the sensor set 20A detects the illumination of the exposure element QA and, at the same time, the light detecting sensor 30A in the sensor set 20A detects the illumination of the exposure element QB'. However, in fact, due to the positional deviation of the exposure element QB', a difference of the time to detect the illumination of the exposure elements occurs between the light detecting sensors 30A and 30B, which are both included in the same sensor set 20A. This detection time difference is defined as t2.

Figure 8:
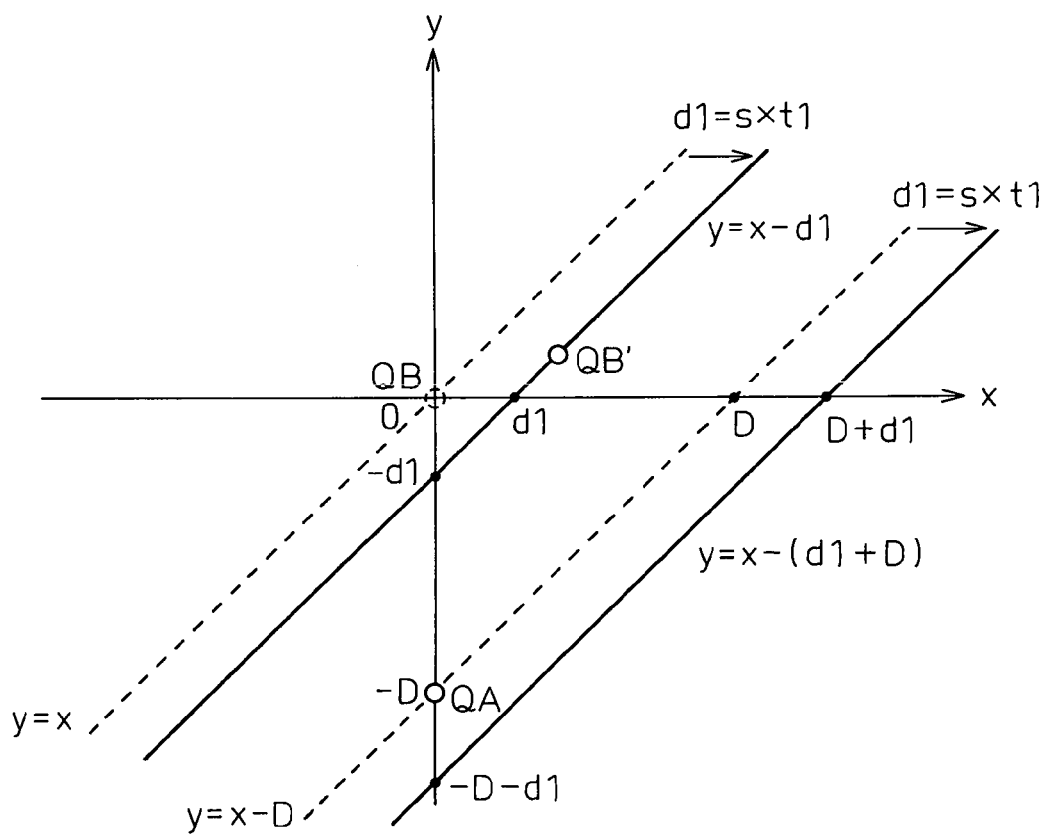
FIG. 8 is a diagram showing a detection time difference on the two-dimensional plane in an embodiment of the present invention (Part 1)
Figure 9:
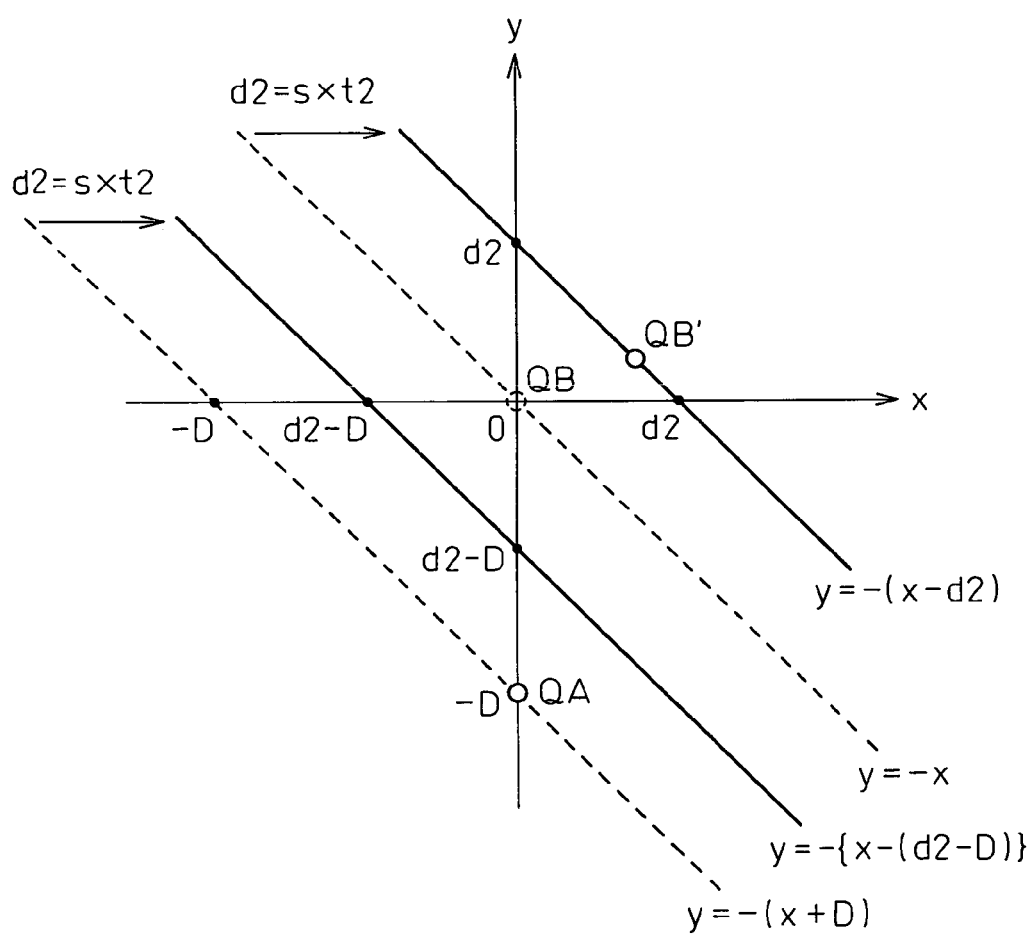
FIG. 9 is a diagram showing a detection time difference on the two-dimensional plane in an embodiment of the present invention (Part 2)
Figure 10:
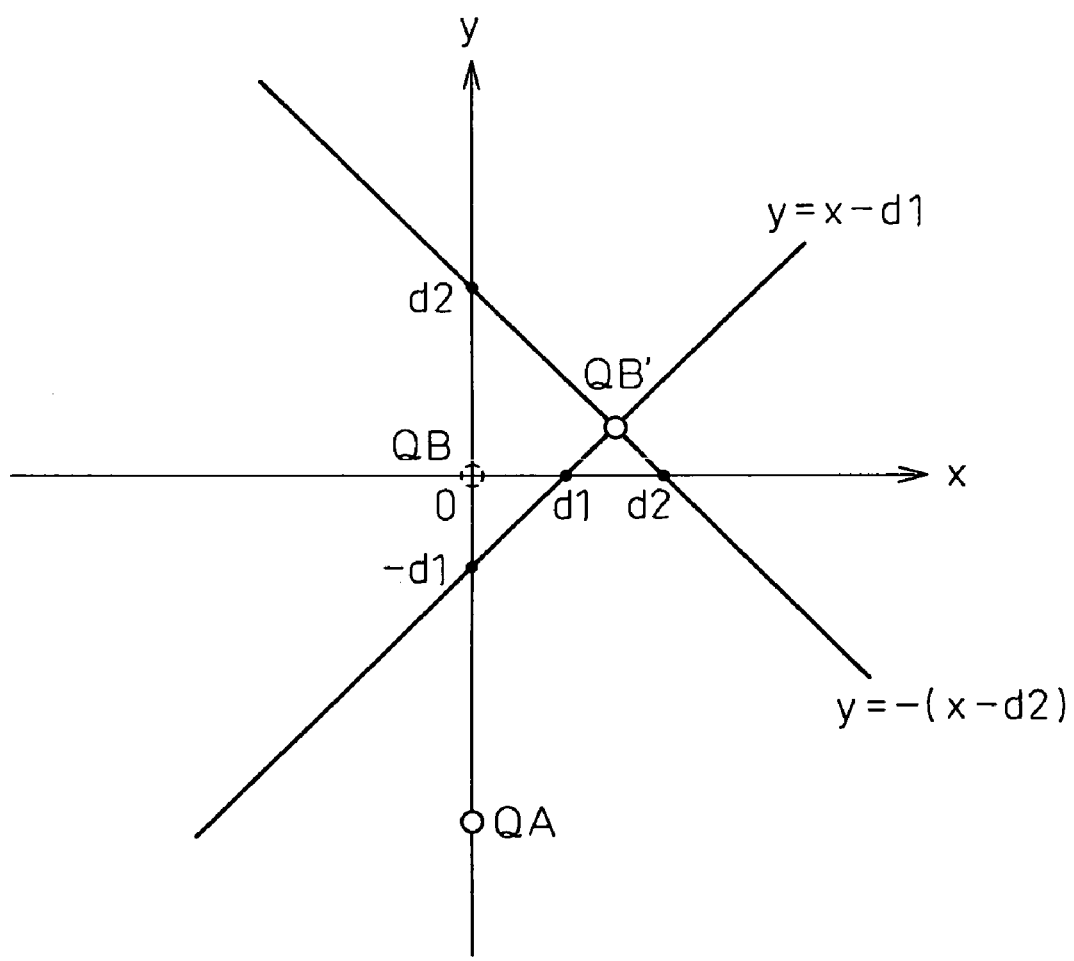
FIG. 10 is a diagram showing a detection time difference on the two-dimensional plane in an embodiment of the present invention (Part 3)

FIGS. 8 to 10 are diagrams showing a detection time difference on a two-dimensional plane in an embodiment of the present invention. Here, a two-dimensional plane is considered in which the designed position of one of the two exposure elements with respect to the other of the two exposure elements is defined as origin and the identical exposure line is defined as one axis. Thus, because the designed position QB of the exposure element QB' is positioned on the exposure line identical to the exposure element QA, a two-dimensional plane in which this identical line connecting QA and QB is defined as the y-axis and QB is defined as origin can be obtained. At this time, the exposure heads are arranged in the positive direction along the x-axis on the two-dimensional plane. In this connection, the distance between QA and QB is defined as D as described above.

In this embodiment, a tangent of the angle of light detecting sensors to the direction in which the exposure heads are arranged is defined as a gradient of a linear expression (a direct function) representing the position of the light detecting sensors on the two-dimensional plane. For example, when the positions of the light detecting sensors 30C and 30D are represented by linear functions on the two-dimensional plane, the gradient of the light detecting sensors 30C and 30D is 45 degrees ($\pi/4$ radian) and, therefore, the gradient of the linear functions is $1(=\tan(\pi/4))$.

Figure 4:
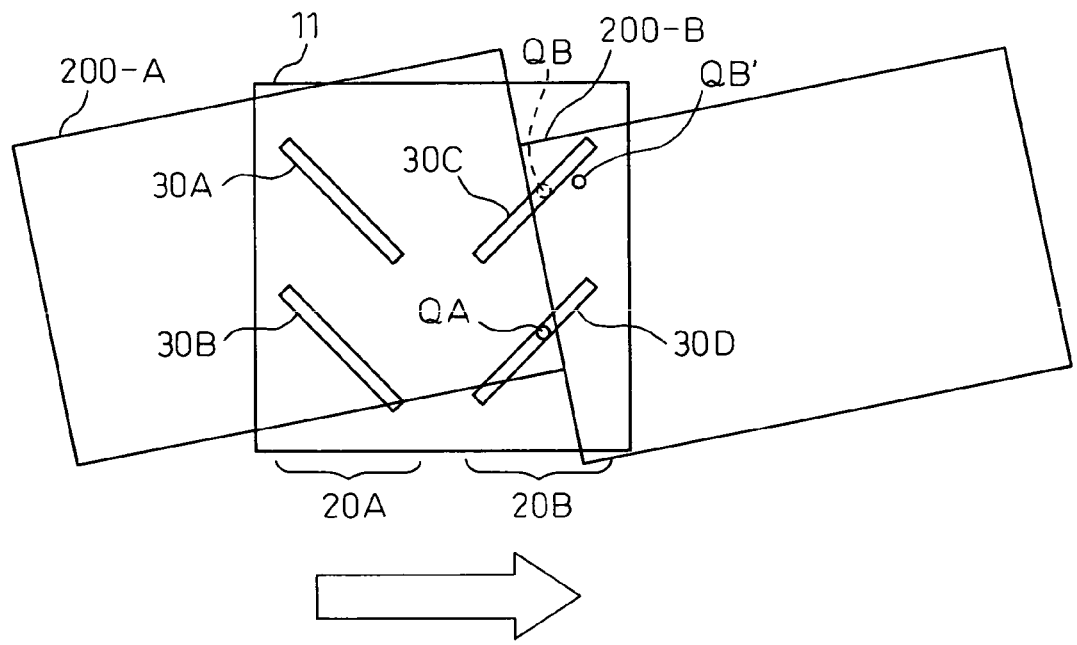
FIG. 4 is a diagram for describing movement of a sensor board with respect to exposure heads in an embodiment of the present invention (Part 2)

When the light detecting sensors 30C and 30D are positioned as shown in FIG. 4 or, in other words, when the light detecting sensor 30D detects the exposure element QA, the positions of the light detecting sensors 30C and 30D on the two-dimensional plane are represented by linear functions $y=x$ and $y=x-D$, respectively, as shown in FIG. 8.

On condition that the sensor board 11 is moved at a speed s, when the time corresponding to the detection time difference t1 mentioned above has passed after the point in time of FIG. 4, the light detecting sensor 30C detects the illumination of the exposure element QB' as shown in FIG. 5. Thus, the light detecting sensors 30C and 30D are translated from the positions shown in FIG. 4 by a distance $d1(=s\times t1)$ in the direction in which the exposure heads are arranged or, in other words, in the positive direction along the x-axis shown on the two-dimensional plane in FIG. 8. Therefore, when the light detecting sensors 30C and 30D are positioned as shown in FIG. 5, the positions of the light detecting sensors 30C and 30D on the two-dimensional plane are represented by linear functions $y=x-d1$ and $y=x-(d1+D)$, respectively, as shown in FIG. 8. Here, $d1>0$.

As the sensor board 11 is moved further, as shown in FIG. 6, the light detecting sensor 30B in the sensor set 20A detects the illumination of the exposure element QA. At this time, the positions of the light detecting sensors 30A and 30B on the two-dimensional plane are represented by linear functions $y=-(x+D)$ and $y=-x$, respectively, as shown in FIG. 9.

When the time corresponding to the detection time difference t2 mentioned above has passed after the point in time of FIG. 6, the light detecting sensor 30A detects the illumination of the exposure element QB' as shown in FIG. 7. Thus, the light detecting sensors 30A and 30B are translated from the positions shown in FIG. 6 by a distance $d2(=s\times t2)$ in the direction in which the exposure heads are arranged or, in other words, in the positive direction along the x-axis on the two-dimensional plane shown in FIG. 9. Therefore, when the light detecting sensors 30A and 30B are positioned as shown in FIG. 7, the positions of the light detecting sensors 30A and 30B on the two-dimensional plane are represented by linear functions y=−(x−d2) and Y=−{x−(d2−D)}, respectively, as shown in FIG. 9. Here, d2>0.

From the foregoing, it can be seen that the exposure element QB' is located at positions on the two linear expressions y=x−d1 and Y=−(x−d2) shown in FIGS. 8 and 9, respectively. Thus, as shown in FIG. 10, the exposure element QB' is positioned at the coordinate of the point of intersection of these two linear expressions P {(d1+d2)/2, (d2−d1)/2} on the two-dimensional plane. Though the designed position QB of the exposure element QB' is positioned at the origin on the two-dimensional plane shown in FIGS. 8 to 10, the detection time difference of the illumination between the exposure elements mentioned above can be obtained by using the sensor board 11 as described above to calculate the coordinate of the point of intersection P so that the actual position of the exposure element QB' with respect to the designed position QB of the exposure element QB' on the two-dimensional plane can be determined. Therefore, the exposure element QB' can be positioned on the line identical to the exposure element QA by performing correction to offset the position of the exposure element QB' by {−(d1+d2)/2} in the positive direction along the x-axis and by {−(d2−d1)/2} in the positive direction along the y-axis. In this embodiment, this value is defined as the correction amount.

As described above, in this embodiment, while the sensor board is moved, differences in time when each light detecting sensor detects the illumination of the exposure elements for the two sensor sets are calculated and defined as the detection time differences. Then, based on the two detection time differences, correction amounts for correcting positional deviation of one of the exposure heads with respect to the other of the exposure heads are calculated. This correction amounts may be used to perform hardware-based correction in which the attachment position of the exposure heads are moved or software-based correction in which exposure data itself to be input to the direct exposure apparatus is corrected in advance. In particular, because the exposure data can be processed easily in real time in the patterning method by direct exposure, the software-based correction to correct the exposure data itself is very effective.

Figure 11:
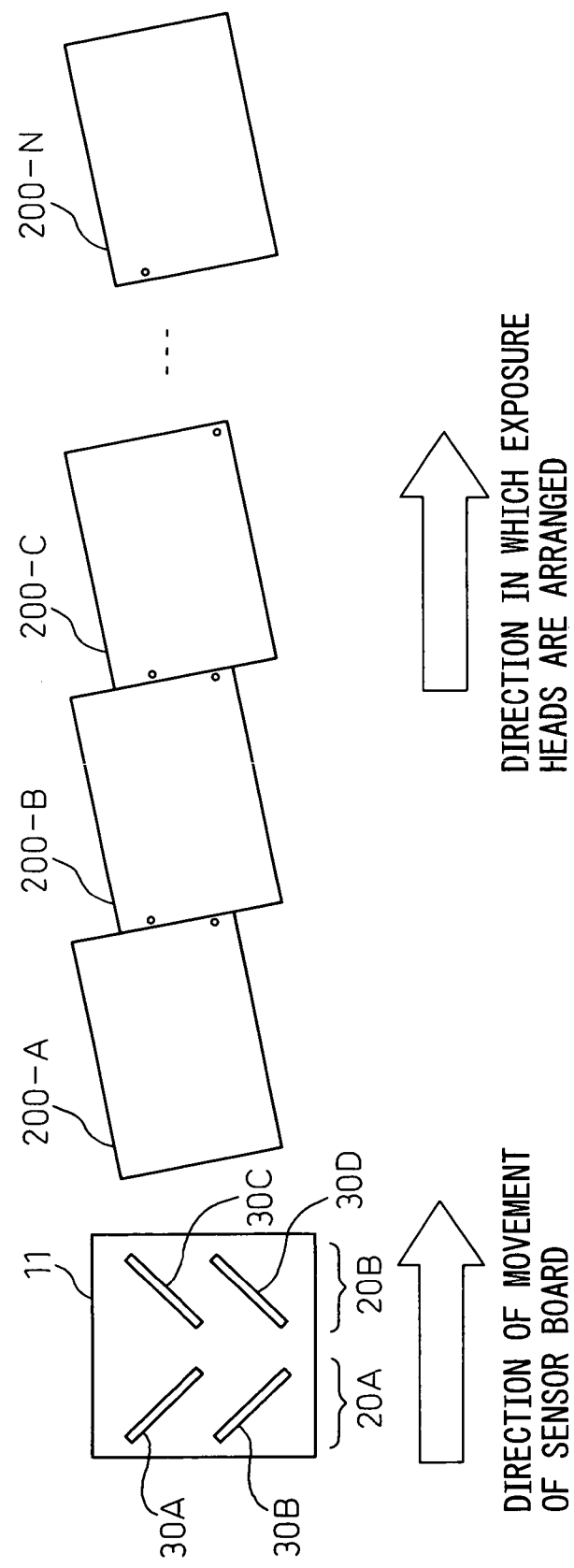
FIG. 11 is a diagram for describing calculation of correction amounts for a plurality of exposure heads according to an embodiment of the present invention.

FIG. 11 is a diagram for describing calculation of correction amounts for a plurality of exposure heads according to an embodiment of the present invention. In the figure, circles designate exposure elements to be illuminated.

While a specific calculation process of the correction amounts for two exposure heads has been described above with reference to FIGS. 2 to 10, a similar process can be performed for more than two exposure heads so that correction amounts for each of the plurality of exposure heads can be calculated. More specifically, as shown in FIG. 11, exposure elements in each of the exposure heads 200-A, 200-B, 200-C, . . . 200-N are illuminated so that the exposure elements have a relationship as described above and, then, the sensor board 11, which is disposed on the side where the exposure heads 200-A, 200-B, 200-C, . . . 200-N are illuminated, is moved in the direction in which the exposure heads are arranged to obtain detection time differences for each of the sensor sets 20A and 20B. Based on the detection time differences, correction amounts to correct positional deviation of one of the exposure heads with respect to the other of the exposure heads are calculated. For example, positional deviation of the exposure head 200-B with respect to the exposure head 200-A is obtained and correction amounts to correct this deviation are calculated. Then, positional deviation of the exposure head 200-C with respect to the exposure head 200-B is obtained and correction amounts to correct this deviation are calculated. By repeating such processes, correction amounts to correct positional deviations of more than two exposure heads can be calculated.

Figure 12:
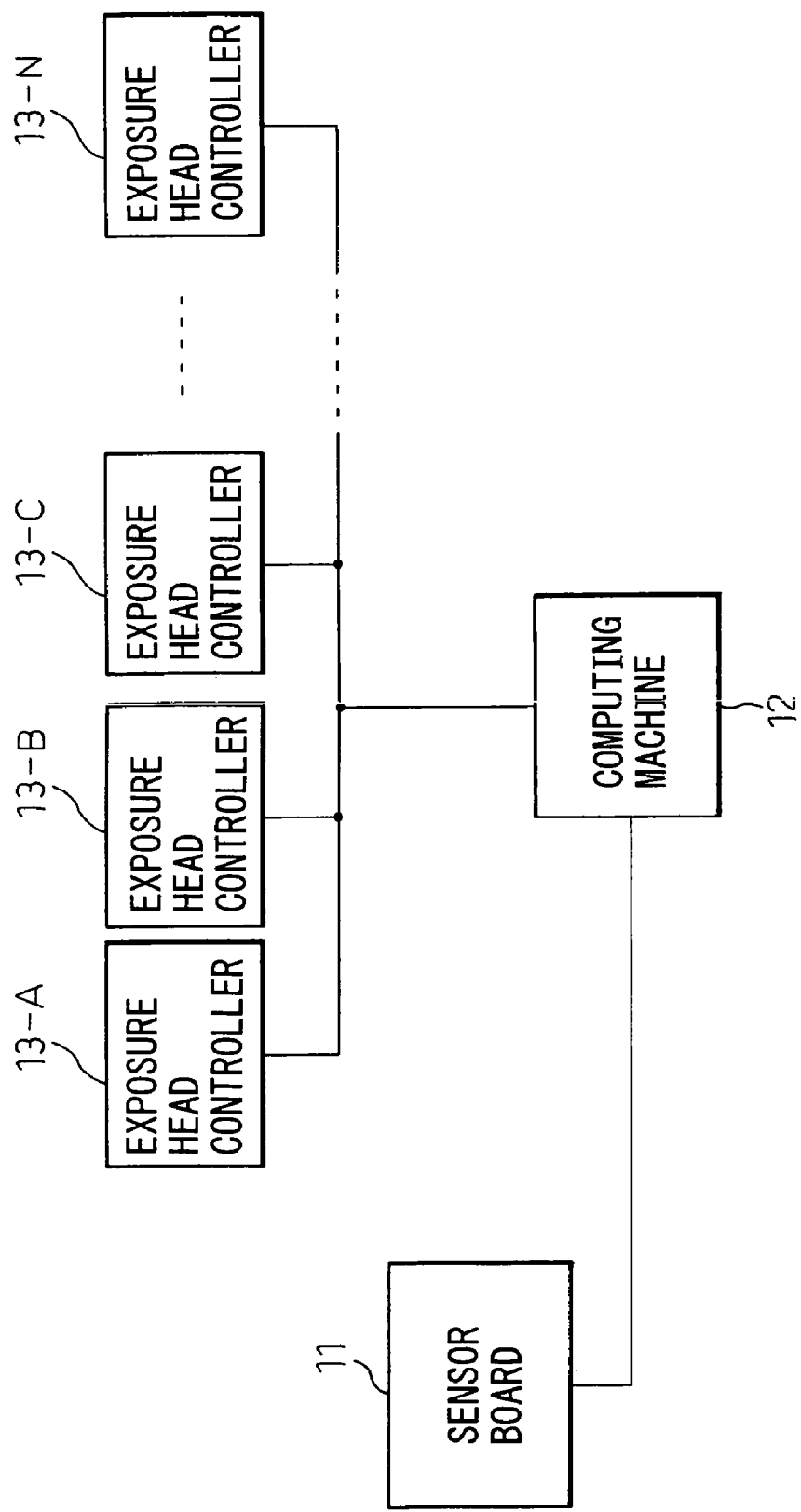
FIG. 12 is a block diagram showing an example of an automatic correction apparatus according to an embodiment of the present invention.

For example, when software-based correction is performed to correct the exposure data itself to be input to the direct exposure apparatus is corrected based on the correction amounts, a parallel processing in which, while the sensor board is moved, exposure data is generated so that the positional deviation of the concerned exposure head is corrected based on the already calculated correction amounts and, at the same time, the correction amounts for the positional deviation of the next exposure head are calculated, can be performed and, therefore, automatic correction can be implemented efficiently. FIG. 12 is a block diagram showing an example of an automatic correction apparatus according to an embodiment of the present invention. A computing machine 12 uses the detection time differences obtained by the sensor board 11 to obtain the positional deviations of the exposure heads and calculate the correction amounts to correct the positional deviations. The computing machine 12 corrects the exposure data based on the calculated correction amounts and supplies it to the corresponding exposure head controllers 13-A, 13-B, 13-C, . . . 13-N.

Figure 13:
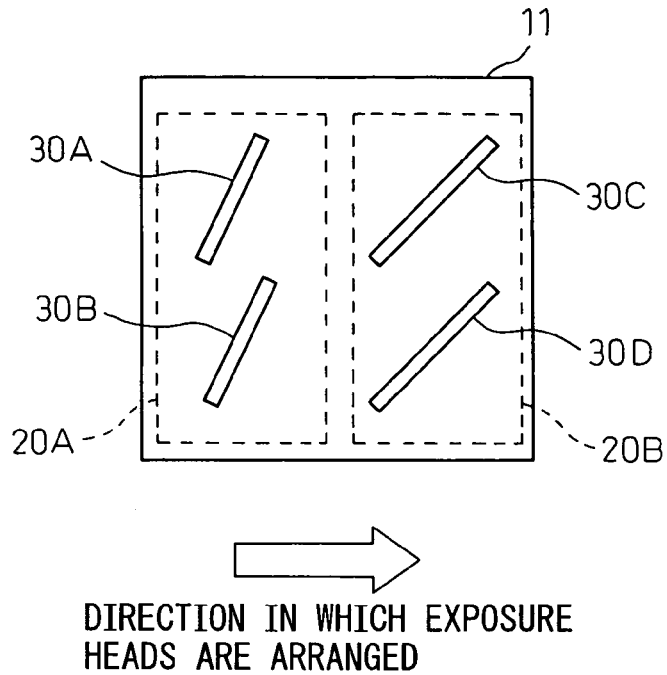
FIG. 13 is a front elevational view showing a first variant of a sensor board in an embodiment of the present invention.

Though the light detecting sensors 30A-30D are disposed so that the light detecting sensors in different sensor sets have different specific angles from each other, such as, for example, the light detecting sensors in the sensor set 20A have an angle of 135 degrees (3π/4 radian) and the light detecting sensors in the sensor set 20B have an angle of 45 degrees (π/4 radian) in the embodiment described above, it is to be noted that these angles are merely examples and the light detecting sensors may have other angles. FIG. 13 is a front elevational view showing a first variant of a sensor board in an embodiment of the present invention. By way of example, this figure shows that the light detecting sensors 30A-30D are disposed so that the light detecting sensors in the sensor set 20A have an angle of 60 degrees (π/3 radian) and the light detecting sensors in the sensor set 20B have an angle of 45 degrees (π/4 radian). In this case, when the light detecting sensors 30A and 30B in the sensor set 20A are represented as a linear function on a two-dimensional plane, their gradient is 2(=tan(π/3)).

Figure 14:
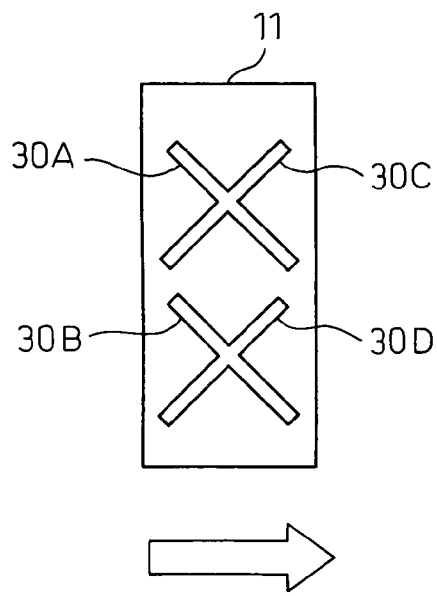
FIG. 14 is a front elevational view showing a second variant of a sensor board in an embodiment of the present invention.

Further, though the sensor sets 20A and 20B are disposed on the sensor board 11 side-by-side in the direction in which the exposure heads are arranged in the embodiment described above, the sensor sets 20A and 20B may be overlaid on each other. FIG. 14 is a front elevational view showing a second variant of a sensor board in an embodiment of the present invention. By way of example, this figure shows that the light detecting sensors 30A-30D are disposed on the sensor board 11 so that the light detecting sensors 30A and 30C and the light detecting sensors 30B and 30D intersect crosswise at the center point, respectively. In this case, when only two exposure elements, which are included in adjacent exposure heads separately and which are to expose an identical exposure line on an exposure target substrate, are illuminated, if these two exposure elements are positioned so that the two exposure elements can expose the identical exposure line as designed or, in other words, if there is no positional deviation, the detection time difference described above is not measured. Thus, if the detection time difference is not measured, it can be judged that there is no positional deviation of the exposure heads and the exposure heads are positioned normally as designed. This variant has an advantage in that the sensor board 11 can be reduced in size.

Figure 15A:
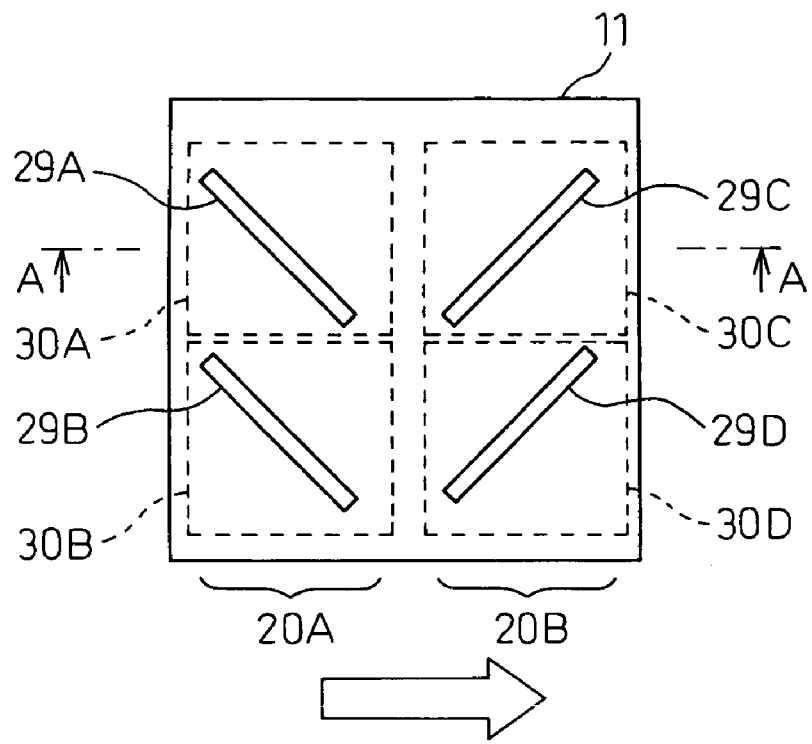
FIG. 15A is a front elevational view showing a specific example of a sensor board in an automatic correction apparatus according to an embodiment of the present invention.
Figure 15B:
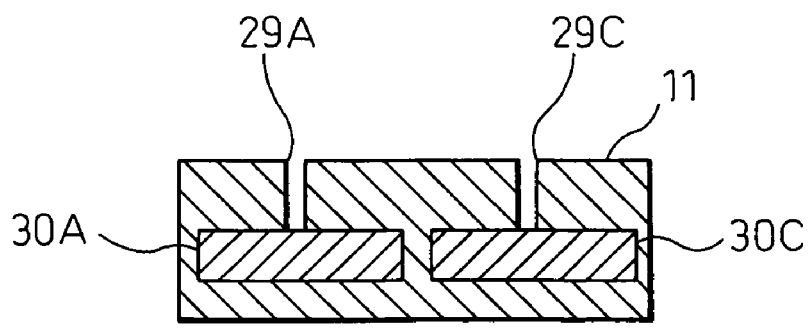
FIG. 15B is a cross-sectional view taken along the line A-A in FIG. 15A.
Figure 16:
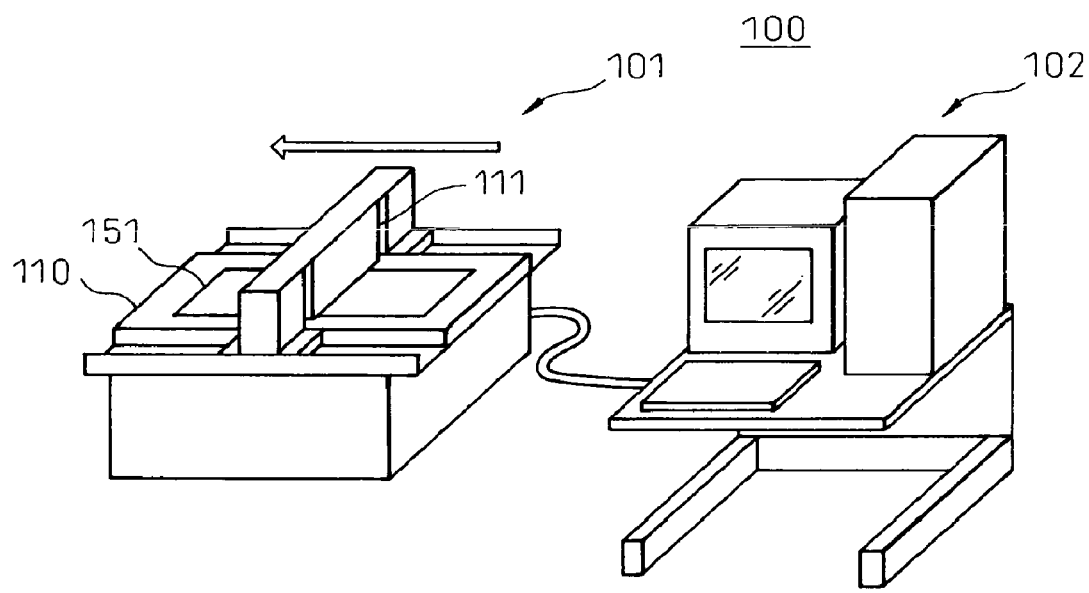
FIG. 16 is a diagram schematically showing a direct exposure system.

FIG. 15A is a front elevational view showing a specific example of a sensor board in an automatic correction apparatus according to an embodiment of the present invention. FIG. 15B is a cross-sectional view taken along the line A-A in FIG. 15A.

The sensor sets 20A and 20B are disposed on the sensor board 11 side-by-side in the direction in which the exposure heads are arranged. More specifically, the sensor sets 20A and 20B are disposed in the sensor board. In the sensor sets 20A, two linear slits 29A and 29B arranged in parallel with each other are provided in a sensor board 11 at an angle of 135 degrees (3π/4 radian) with respect to the direction in which the exposure heads are arranged (shown by the arrow in the figure) and the light detecting sensors 30A and 30B are disposed under the slits 29A and 29B, respectively. On the other hand, in the sensor sets 20B, two linear slits 29C and 29D arranged in parallel with each other are provided in the sensor board 11 at an angle of 45 degrees (π/4 radian) with respect to the direction in which the exposure heads are arranged and the light detecting sensors 30C and 30D are disposed under the slits 29C and 29D, respectively. Thus, the slits 29A-29D are provided on the light receiving surfaces of the light detecting sensors 30A-30D, respectively, so that the light detecting sensors 30A-30D are formed linearly and the light receiving surfaces are exposed in a slit manner. Such sensor board 11 is disposed and moved in the direction in which the exposure heads are arranged so that the side surface on which the slits 29A-29D are opened faces toward the illuminating side of the exposure heads.

The present invention can be applied to a direct exposure apparatus in which a plurality of exposure heads having exposure elements arranged in a two-dimensional manner with an inclination with respect to relative movement of an exposure target (e.g., an exposure target substrate) are arranged in a direction orthogonal to the relative movement. According to the present invention, correction amounts to correct positional deviation of exposure heads can be obtained automatically. In particular, in a patterning method by direct exposure, exposure data can be processed in real-time easily and, therefore, the exposure data itself can be corrected very effectively.

The correction amounts obtained according to the present invention can be used to correct the attachment position of the exposure heads or to correct the exposure data itself input to the direct exposure apparatus based on the correction amounts so that a sufficient exposure value can be obtained. In particular, in the direct exposure apparatus, exposure data can be processed in real-time easily and, therefore, the exposure data itself can be corrected very effectively. Further, when software-based correction is performed to correct the exposure data itself to be input to the direct exposure apparatus based on the correction amounts, parallel processing, in which, while the sensor board is moved, exposure data is generated so that the positional deviation of the concerned exposure head is corrected based on the already calculated correction amounts and, at the same time, the correction amounts for the positional deviation of the next exposure head are calculated, can be performed and, therefore, automatic correction can be implemented efficiently.

What is claimed is:

1. An automatic correction method for a direct exposure apparatus in which a plurality of exposure heads having exposure elements arranged in a two-dimensional manner with an inclination with respect to relative movement of an exposure target are arranged in a direction orthogonal to the direction of said relative movement, comprising:

an illumination step of illuminating two exposure elements, which are included in adjacent ones of said exposure heads separately and which are to expose an identical line on said exposure target, among said exposure elements;

a detection step of detecting the illumination of said two exposure elements by using a sensor that is moved, on the side where said exposure heads are illuminated, in the direction in which said exposure heads are arranged; and a correction step of calculating correction amounts for correcting so that said two exposure elements can expose the identical line on said exposure target, based on a detection result of the illumination of said exposure elements by said sensor.

2. An automatic correction method according to claim 1, wherein said sensor has a sensor board, and two sensor sets in each of which two linear light detecting sensors that are parallel with each other are arranged at specific angles with respect to the direction in which said exposure heads are arranged, and said light detecting sensors are arranged on said sensor board so that said light detecting sensors in one of said sensor sets have said specific angle that is different from those in the other of said sensor sets.

3. An automatic correction method according to claim 2, wherein said sensor sets are arranged on said sensor board side-by-side in the direction in which said exposure heads are arranged.

4. An automatic correction method according to claim 2, wherein said sensor sets are overlaid on each other on said sensor board.

5. An automatic correction method according to claim 2, wherein said correction step comprises the steps of:

calculating differences in time when each of the light detecting sensors detects the illumination of said exposure elements while said sensor board is moved for the two of said sensor sets as detection time differences; and based on the two detection time differences, calculating said correction amounts.

6. An automatic correction method according to claim 5, wherein said correction step comprises:

a first calculation step of calculating multiplication values for each of said sensor sets by multiplying said detection time differences for each of said sensor sets by moving speed of said sensor board;

a second calculation step of calculating linear functions for each of said sensor sets, each of the linear functions having a gradient that is a tangent of said specific angle and a segment that is one of said multiplication values in a two-dimensional plane in which a designed position of one of said two exposure elements with respect to the other is defined as origin and said identical line is defined as one axis;

a third calculation step of calculating a point of intersection of said two linear functions on said two-dimensional plane; and a fourth calculation step of calculating values of correction amounts by multiplying each coordinate value of said point of intersection by −1.

7. An automatic correction apparatus for a direct exposure apparatus comprising a plurality of exposure heads having exposure elements arranged in a two-dimensional manner with an inclination with respect to relative movement of an exposure target are arranged in a direction orthogonal to the direction of said relative movement, comprising:

a sensor having two sensor sets in each of which two linear light detecting sensors that are parallel with each other are arranged at specific angles with respect to the direction in which said exposure heads are arranged, wherein said light detecting sensors are arranged so that said light detecting sensors in one of said sensor sets have said specific angle that is different from those in the other of said sensor sets; and moving means for moving said sensor, on the side where said exposure heads are illuminated, in the direction in which said exposure heads are arranged so that illumination of two exposure elements, which are included in adjacent ones of said exposure heads and which are to expose an identical line on said exposure target, among said exposure elements can be detected.

8. An automatic correction apparatus according to claim 7, wherein said sensor sets are arranged on a sensor board side-by-side in the direction in which said exposure heads are arranged.

9. An automatic correction apparatus according to claim 7, wherein said sensor sets are overlaid on each other on a sensor board.

10. An automatic correction apparatus according to claim 7, wherein said light detecting sensors are formed linearly by providing slits on the light receiving surfaces of sensor main bodies.

11. An automatic correction apparatus according to claim 7, further comprising correction means for calculating correction amounts for correcting so that said two exposure elements can expose the identical line on said exposure target, based on a detection result of the illumination of said two exposure elements by said sensor.

12. An automatic correction apparatus according to claim 11, wherein, said correction means calculates differences in time when each of said light detecting sensors detects the illumination of said exposure elements while said sensor board is moved as detection time differences and, based on the two detection time differences, calculates said correction amounts.

13. An automatic correction apparatus according to claim 12, wherein said correction means comprises:

first calculation means for calculating multiplication values for each of said sensor sets by multiplying said detection time differences for each of said sensor sets by moving speed of said sensor board;

second calculation means for calculating linear functions for each of said sensor sets, each of the linear functions having a gradient that is a tangent of said specific angle and a segment that is one of said multiplication values in a two-dimensional plane in which a designed position of one of said two exposure elements with respect to the other is defined as origin and said identical line is defined as one axis;

third calculation means for calculating a point of intersection of said two linear functions on said two-dimensional plane; and fourth calculation means for calculating values of correction values by multiplying each coordinate value of said point of intersection by $-1$.

* * * * *